(12) United States Patent
Sakai

(10) Patent No.: US 10,919,095 B2
(45) Date of Patent: Feb. 16, 2021

(54) CUTTING INSERT, CUTTING TOOL, AND METHOD OF MANUFACTURING MACHINED PRODUCT

(71) Applicant: KYOCERA CORPORATION, Kyoto (JP)

(72) Inventor: Kohei Sakai, Duesseldorf (DE)

(73) Assignee: KYOCERA Corporation, Kyoto (JP)

( * ) Notice: Subject to any disclaimer, the term of this patent is extended or adjusted under 35 U.S.C. 154(b) by 133 days.

(21) Appl. No.: 16/317,041

(22) PCT Filed: Jul. 10, 2017

(86) PCT No.: PCT/JP2017/025161
§ 371 (c)(1),
(2) Date: Jan. 11, 2019

(87) PCT Pub. No.: WO2018/012463
PCT Pub. Date: Jan. 18, 2018

(65) Prior Publication Data
US 2019/0240740 A1  Aug. 8, 2019

(30) Foreign Application Priority Data
Jul. 11, 2016 (JP) .............................. JP2016-136714

(51) Int. Cl.
*B23B 27/14* (2006.01)
(52) U.S. Cl.
CPC ...... *B23B 27/145* (2013.01); *B23B 2200/201* (2013.01); *B23B 2200/205* (2013.01)

(58) Field of Classification Search
CPC ..... B23B 27/14; B23B 27/141; B23B 27/143; B23B 27/145; B23B 27/1611;
(Continued)

(56) References Cited

U.S. PATENT DOCUMENTS 4,645,384 A * 2/1987 Shimomura .......... B23C 5/2243
407/42
4,681,488 A * 7/1987 Markusson ............. B23C 5/202
407/113
(Continued)

FOREIGN PATENT DOCUMENTS

DE 2162682 A1 * 7/1973 ........... B23B 27/141
DE 4309897 A1 * 8/1994 ........... B23B 27/141
(Continued)

*Primary Examiner* — Ryan C Rufo
(74) *Attorney, Agent, or Firm* — Viering, Jentschura & Partner MBB

(57) ABSTRACT

A cutting insert may include a first surface, a second surface, a third surface, and a cutting edge. The first surface may include a first side part, a second side part, and a third side part. The cutting edge may be located at an intersection of the first surface and the third surface. The cutting edge may include a first cutting edge, a second cutting edge, and a third cutting edge. The third cutting edge may be located between the first cutting edge and the second cutting edge and have a convex curvilinear shape. The first cutting edge may be located asymmetrically relative to a bisector of an angle formed by the first side part and the second side part. The first surface may include a first inclined surface located along the first cutting edge and inclined toward the second surface at a first inclination angle.

10 Claims, 17 Drawing Sheets

(58) Field of Classification Search
CPC .............. B23B 27/1622; B23B 27/164; B23B 27/1651; B23B 27/1603; B23B 27/1607; B23B 2200/201; B23B 2200/202; B23B 2200/205; B23B 2200/207; B23B 2200/208; B23B 2200/20; B23C 2200/201

See application file for complete search history.

(56) References Cited

U.S. PATENT DOCUMENTS

| | | | | | |
|---|---|---|---|---|---|
| 4,930,945 | A * | 6/1990 | Arai | ........................ | B23C 5/207 407/113 |
| 5,388,932 | A * | 2/1995 | DeRoche | ................. | B23C 5/207 407/113 |
| 5,593,255 | A | 1/1997 | Satran et al. | | |
| 6,761,510 | B2 * | 7/2004 | Kinukawa | ............. | B23B 27/145 407/113 |
| 6,786,682 | B1 | 9/2004 | Wiman | ................. | B23B 27/143 407/114 |
| 7,488,143 | B2 * | 2/2009 | Muren | ................. | B23B 27/007 407/113 |
| 8,882,408 | B2 * | 11/2014 | Ishi | ........................... | B23C 5/06 407/116 |
| 8,961,076 | B2 * | 2/2015 | Ishi | ........................ | B23C 5/202 407/42 |
| 9,022,700 | B2 * | 5/2015 | Bhagath | ............. | B23B 27/1611 407/113 |
| 10,010,950 | B2 * | 7/2018 | Matsumura | ............... | B23C 5/06 |
| 10,512,975 | B2 * | 12/2019 | Roman | .................. | B23C 5/109 |
| 2003/0031520 | A1 * | 2/2003 | Hintze | ................. | B23B 27/141 407/114 |
| 2003/0077131 | A1 * | 4/2003 | Wiman | ................. | B23B 27/141 407/114 |
| 2004/0146365 | A1 | 7/2004 | Usui et al. | | |
| 2007/0041798 | A1 * | 2/2007 | Nasu | ....................... | B23C 5/202 407/114 |
| 2010/0221076 | A1 * | 9/2010 | Takahashi | ................. | B23C 5/06 407/42 |
| 2010/0266353 | A1 * | 10/2010 | Zitzlaff | ................... | B23C 5/207 407/113 |
| 2011/0305534 | A1 * | 12/2011 | Park | ....................... | B23B 29/04 407/100 |
| 2013/0064613 | A1 * | 3/2013 | Krishtul | ................ | B23B 27/143 407/114 |
| 2014/0010605 | A1 * | 1/2014 | Smilovici | ................. | B23C 5/06 407/42 |
| 2014/0314509 | A1 | 10/2014 | Yamamichi | | |
| 2015/0246398 | A1 * | 9/2015 | Kawasaki | ............. | B23B 27/141 408/231 |
| 2016/0339525 | A1 * | 11/2016 | Matsuda | ............... | B23B 27/143 |
| 2017/0014919 | A1 * | 1/2017 | Kister | ..................... | B23C 5/202 |

FOREIGN PATENT DOCUMENTS

| | | | | |
|---|---|---|---|---|
| DE | 10308234 | A1 * | 9/2004 | .......... B23B 27/145 |
| EP | 0661122 | A1 * | 7/1995 | .......... B23B 27/141 |
| EP | 2998053 | A1 * | 3/2016 | ............ B23C 5/207 |
| JP | H06190612 | A | 7/1994 | |
| JP | H07241706 | A | 9/1995 | |
| JP | H0866815 | A | 3/1996 | |
| JP | 2001219315 | A | 8/2001 | |
| JP | 2004237438 | A | 8/2004 | |
| JP | 2010125566 | A | 6/2010 | |
| JP | 2011115896 | A | 6/2011 | |
| JP | 2015136777 | A | 7/2015 | |
| WO | WO-2004009275 | A1 * | 1/2004 | .......... B23B 27/141 |
| WO | 2013065347 | A1 | 5/2013 | |
| WO | WO-2015080168 | A1 * | 6/2015 | ............ B23C 5/109 |

* cited by examiner

CUTTING INSERT, CUTTING TOOL, AND METHOD OF MANUFACTURING MACHINED PRODUCT

CROSS-REFERENCE TO RELATED APPLICATIONS

This application is a national stage entry according to 35 U.S.C. 371 of PCT Application No. PCT/JP2017/025161 filed on Jul. 10, 2017, which claims priority to Japanese Application No. 2016-136714 filed on Jul. 11, 2016, which are entirely incorporated herein by reference.

TECHNICAL FIELD

The present disclosure relates to a cutting insert, a cutting tool, and a method of manufacturing a machined product.

BACKGROUND

Indexable cutting tools with a cutting insert attached to a holder have been used as a cutting tool used in a cutting process or the like. The cutting insert used for the cutting tool usually includes a polygonal-shaped upper surface, a side surface, and a cutting edge located at an intersecting part of the upper surface and the side surface. A workpiece can be cut out by bringing the cutting edge into contact with the workpiece.

Patent Document 1 (Japanese Unexamined Patent Publication No. 2010-125566) discusses a cutting insert used for the above cutting tool. The cutting insert of Patent Document 1 may include an upper surface 2, two side surfaces 4 constituting a corner part, a cutting surface 5 disposed between the side surfaces 4, and a major cutting edge 22 located at an intersecting part of the cutting surface 5 and the upper surface 2. The major cutting edge 22 may be inclined at an angle at which it is possible to set a side cutting edge angle α of 60 degrees or more and 90 degrees or less in a state in which the cutting insert is attached to the holder.

In recent years, there has been a demand for a cutting insert that offers good cutting performance under more severe cutting conditions. Particularly, when machining a difficult-to-cut material, such as super heat-resistant alloy, a large cutting load is exerted on the cutting insert. Cutting conditions including a high depth of cut has been often employed for the purpose of improving cutting efficiency. There has been a demand for a cutting insert that also offers good cutting performance in a machining process subjected to the large cutting load and a machining process at the high depth of cut.

SUMMARY

A cutting insert may include a first surface, a second surface, a third surface, and a cutting edge. The first surface may include a first side part, a second side part, and a third side part located between the first side part and the second side part. The second surface may be located opposite of the first surface. The third surface may be located between the first surface and the second surface. The cutting edge may be located at an intersecting part of the first surface and the third surface. The cutting edge may include a first cutting edge, a second cutting edge, and a third cutting edge. The first cutting edge may be located at the third side part and has a straight line shape in a plan view of the first surface. The second cutting edge may be located at the second side part and have a straight line shape in the plan view of the first surface. The third cutting edge may be located between the first cutting edge and the second cutting edge, and have a convex curvilinear shape in the plan view of the first surface. The first cutting edge may be located asymmetrically relative to a bisector of an angle formed by the first side part and the second side part in the plan view of the first surface. The first surface may include a first inclined surface located along the first cutting edge and inclined toward the second surface at a first inclination angle θ1 as going away from the first cutting edge.

A cutting tool may include the cutting insert described above, and a holder designed to attach the cutting insert to the holder.

A method of manufacturing a machined product may include rotating a workpiece, bringing the cutting edge of the cutting tool described above into contact with the workpiece being rotated, and moving the cutting tool away from the workpiece.

DETAILED DESCRIPTION

<Cutting Insert>

Figure 1:
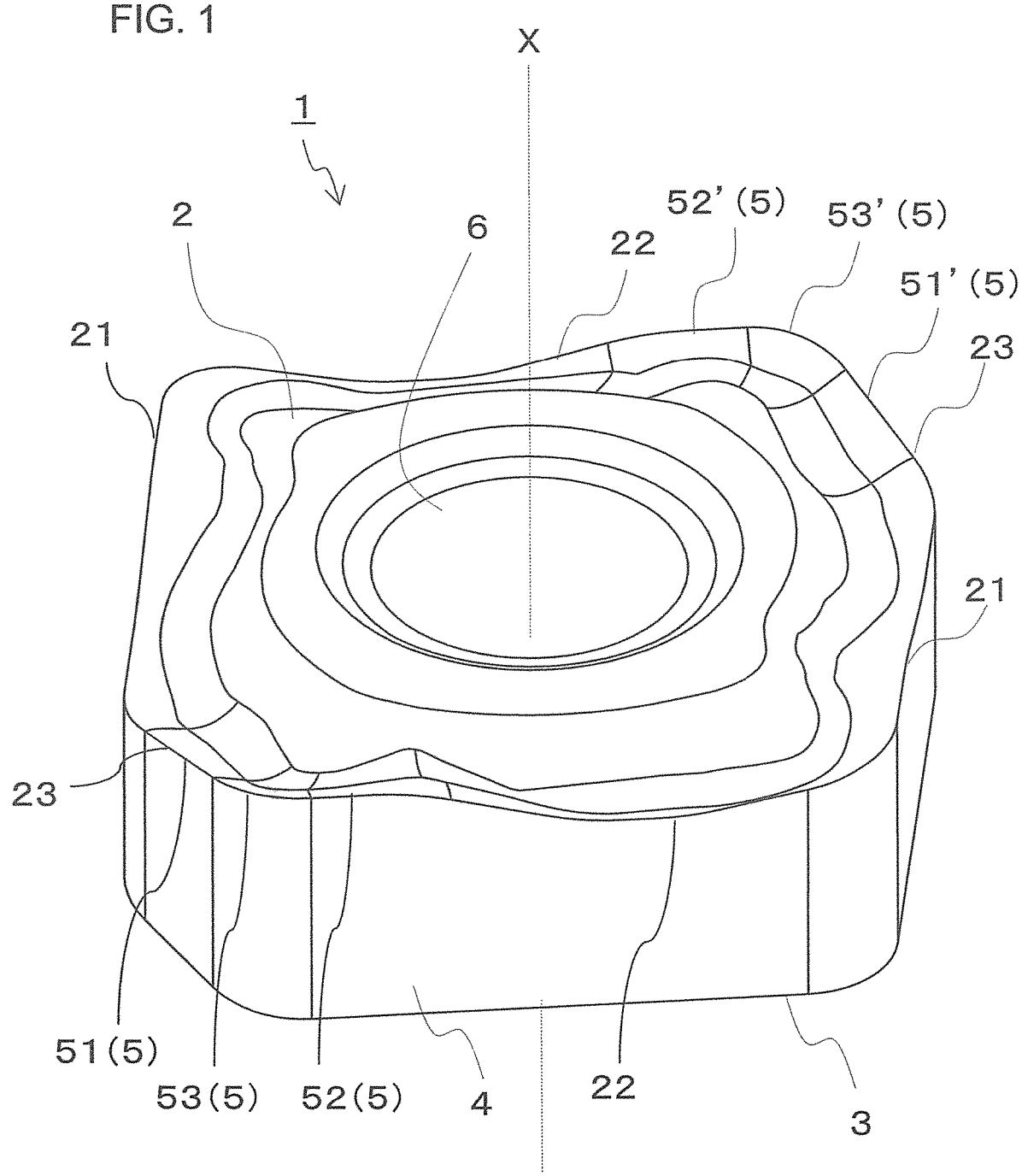
FIG. 1 is a perspective view illustrating a cutting insert in a non-limiting aspect of the present disclosure.

The cutting insert in a non-limiting aspect of the present disclosure is described in detail below with reference to the drawings. For the sake of description, the drawings referred to in the following illustrate, in a simplified form, only main members necessary for describing various aspects of the disclosure. The cutting insert in the present disclosure is therefore capable of including any arbitrary structural member not illustrated in the drawings referred to. Sizes of the members in each of the drawings do not faithfully represent actual structural members and size ratios of these members. These points are also true for a cutting tool and a method of manufacturing a machined product described later.

The cutting insert 1 (hereinafter also referred to as "insert 1") in the present non-limiting aspect of the disclosure includes an upper surface (first surface) 2, a lower surface (second surface) 3, a side surface (third surface) 4, a cutting edge 5, and a through hole 6 as illustrated in FIGS. 1 to 5. The lower surface 3 is not illustrated in FIG. 2, and the upper surface 2 is not illustrated in FIG. 5. The upper surface 2 and the lower surface 3 are called for convenience sake and do not indicate up and down directions. The surfaces need not be directed upward when attached to a holder 103 described later.

Firstly, the insert 1 is described in terms of material. For example, cemented carbide or cermet is usable as a material of the insert 1.

Examples of compositions of the cemented carbide include WC—Co, WC—TiC—Co, and WC—TiC—TaC—Co. The WC—Co is produced by adding cobalt (Co) powder to tungsten carbide (WC), followed by sintering. The WC—TiC—Co is produced by adding titanium carbide (TiC) to WC—Co. The WC—TiC—TaC—Co is produced by adding tantalum carbide (TaC) to WC—TiC—Co.

The cermet is a sintered composite material obtainable by compositing metal into a ceramic ingredient. A specific example of the cermet is one which is composed mainly of a titanium compound, such as titanium carbide (TiC) or titanium nitride (TiN).

A surface of the insert 1 may be coated with a coating film by using chemical vapor deposition (CVD) method or physical vapor deposition (PVD) method. As a composition of the coating film, there are, for example, titanium carbide (TiC), titanium nitride (TiN), titanium carbonitride (TiCN), and alumina ($Al_2O_3$).

Secondly, the insert 1 is described in terms of shape.

Figure 2:
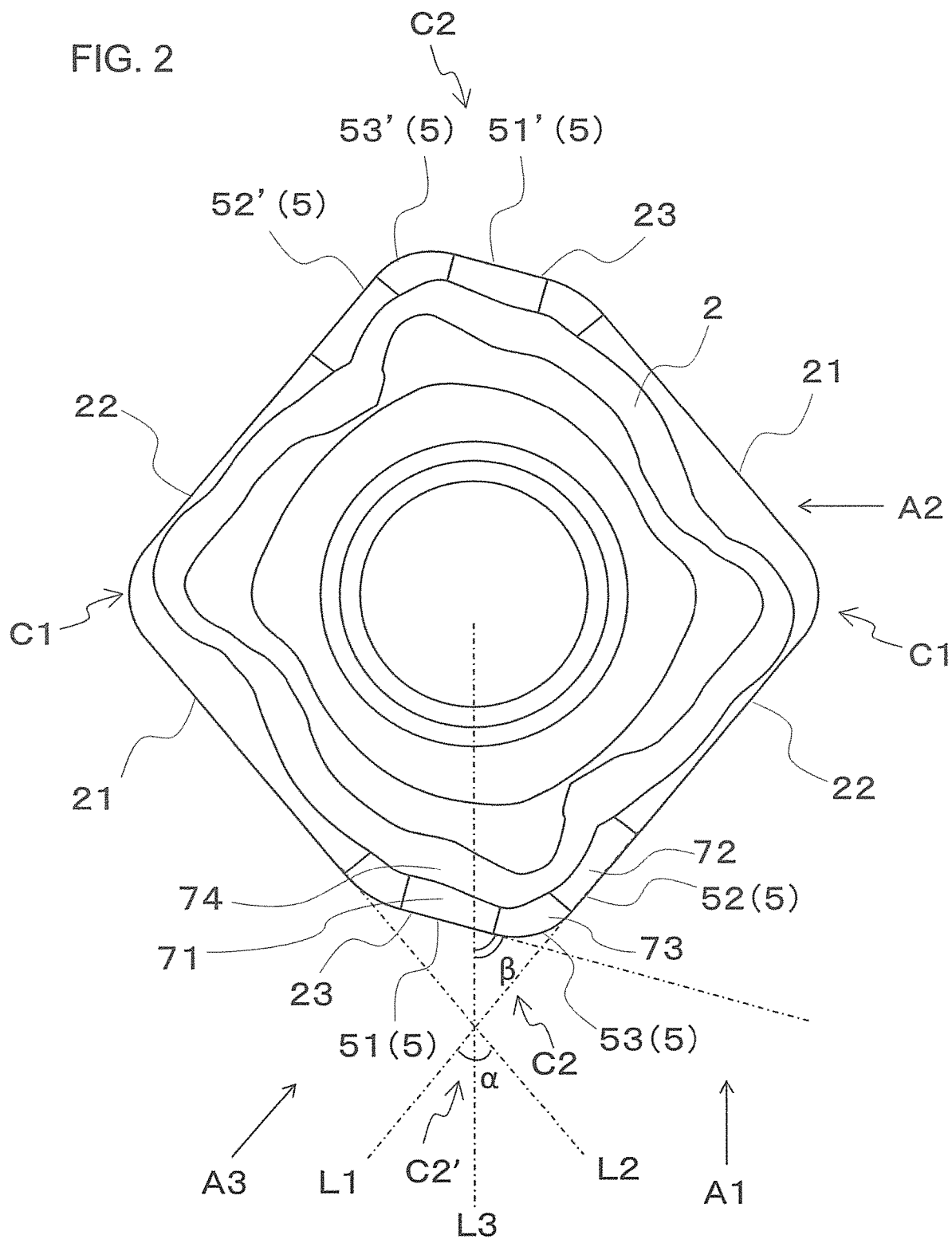
FIG. 2 is a top view of the cutting insert illustrated in FIG. 1.

The upper surface 2 has an approximately quadrangular shape, more specifically an approximately rhombus shape when the upper surface 2 is viewed from above as illustrated in FIG. 2. Even more specifically, the upper surface 2 has the approximately rhombus shape including two obtuse angle corners C1 and two acute angle corners C2. A plurality of side parts are disposed at the two acute corners C2. Specifically, the upper surface 2 includes two first side parts 21, two second side parts 22, and two third side parts 23. Each of the acute angle corners C2 is composed of a first side part 21, a second side part 22, and a third side part 23. It is here assumed that a corner formed by an imaginary extension line L1 of the first side part 21 and an imaginary extension line L2 of the second side part 22 is an imaginary corner C2' corresponding to the acute angle corner C2. The third side part 23 is located between the first side part 21 and the second side part 22. It can therefore be said that the third side part 23 is located so as to cut off the imaginary corner C2' at the acute corner C2. An angle α of the imaginary corner C2' corresponding to the acute angle corner C2 is an angle, namely, an acute angle formed by the imaginary extension line L1 of the first side part 21 and the imaginary extension line L2 of the second side part 22. The angle α is settable to, for example, 35 degrees or more.

The upper surface 2 has the approximately rhombus shape and has the shape with 180-degree rotational symmetry about a center of the upper surface 2.

Figure 5:
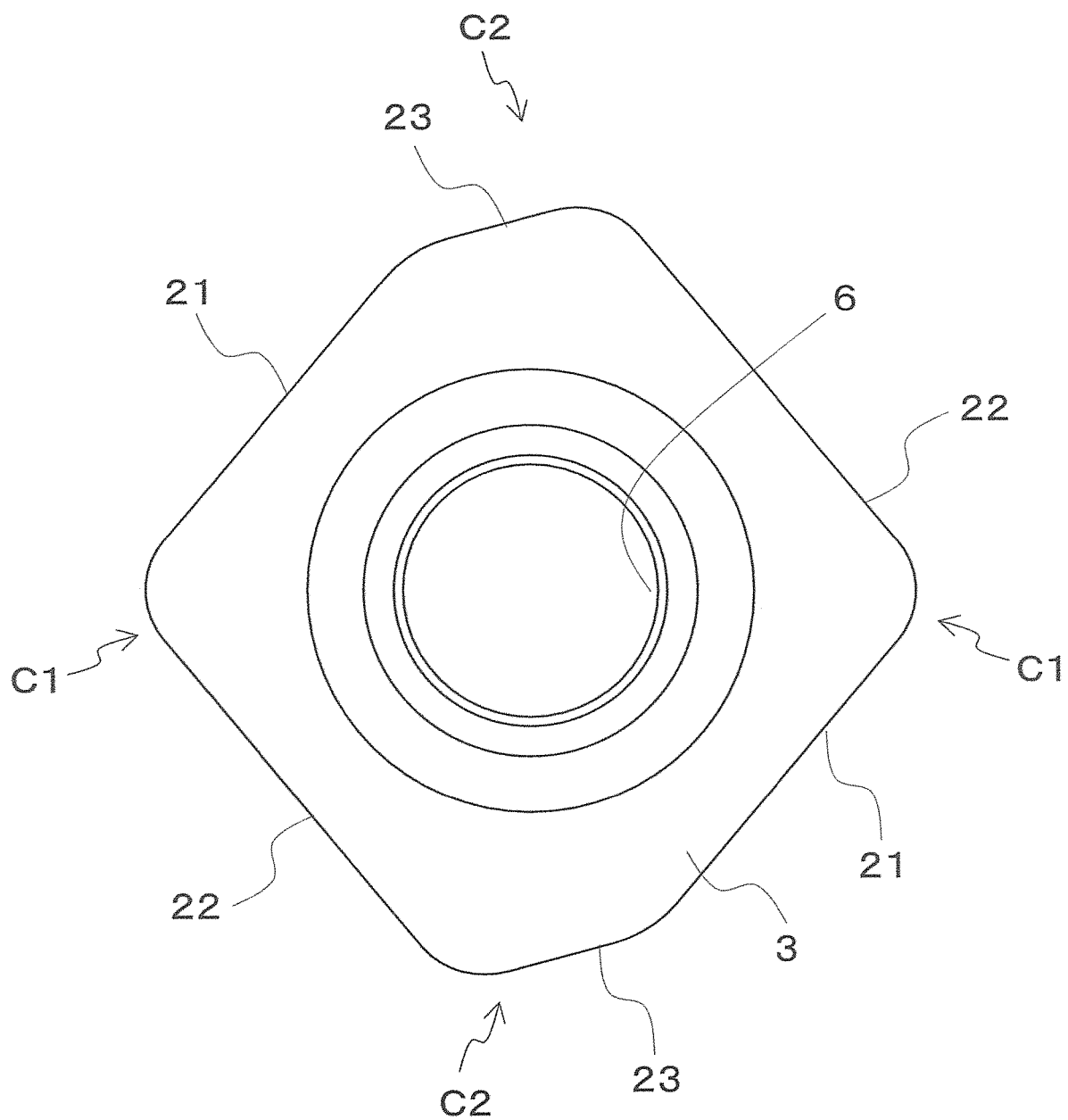
FIG. 5 is a bottom view of the cutting insert illustrated in FIG. 1.

The lower surface 3 is located opposite of the upper surface 2 as illustrated in FIG. 5. The lower surface 3 has approximately the same shape as the upper surface 2 in the present non-limiting aspect of the disclosure. The lower surface 3 is flat over an entire region. Thus, the lower surface 3 functions as a seating surface when the insert 1 is attached to the holder.

Figure 3:
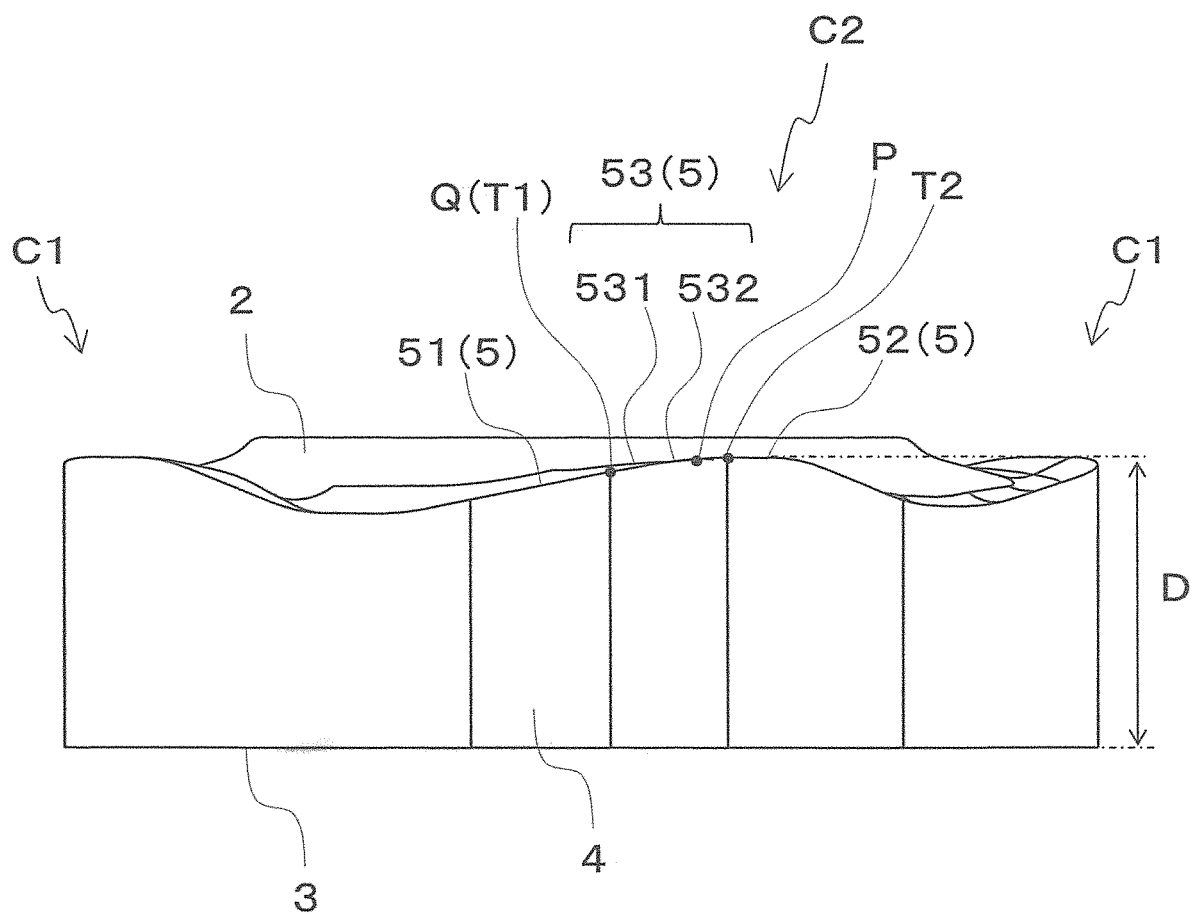
FIG. 3 is a side view of the cutting insert illustrated in FIG. 1, taken in A1 direction.
Figure 4:
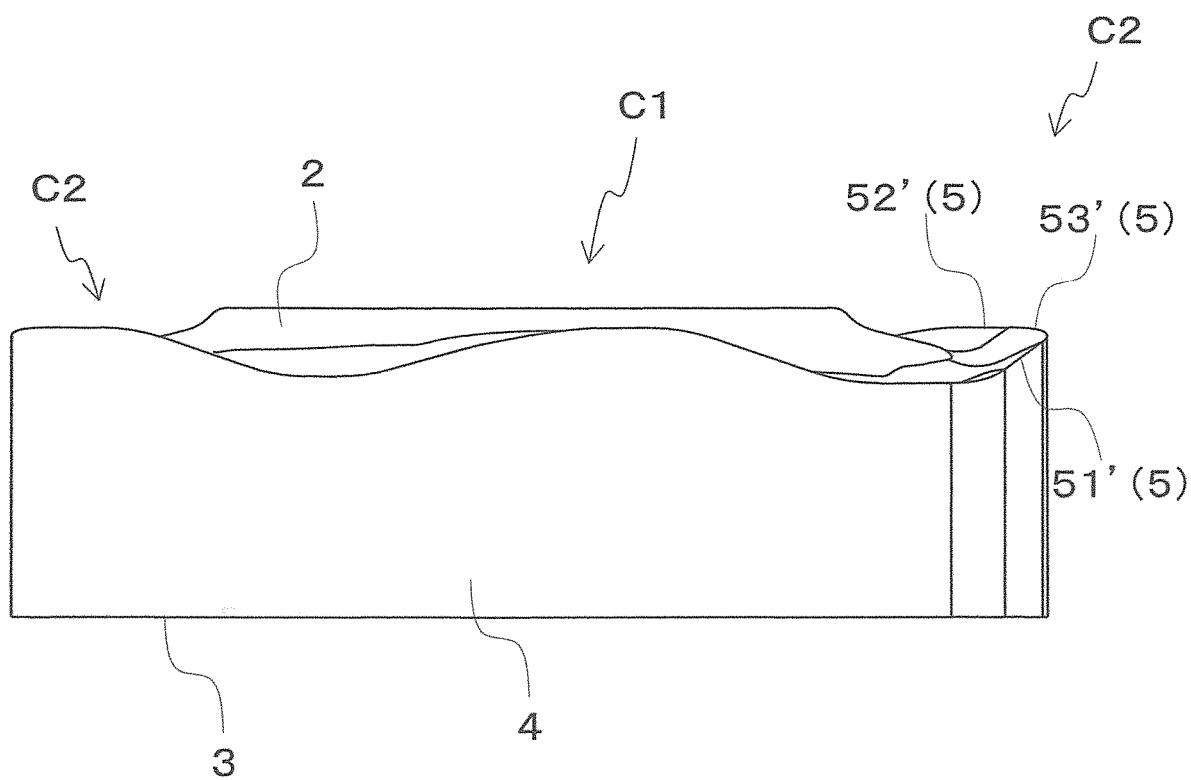
FIG. 4 is a side view of the cutting insert illustrated in FIG. 1, taken in A2 direction.

The side surface 4 is located between the upper surface 2 and the lower surface 3, and connects to each of the upper surface 2 and the lower surface 3 as illustrated in FIGS. 1, 3, and 4. The side surface 4 is disposed vertical to the upper surface 2 and the lower surface 3 in the present non-limiting aspect of the disclosure. Thus, when the upper surface 2 and the lower surface 3 are viewed from above, both are overlapped with each other, namely, have approximately the same shape. Accordingly, as illustrated in FIG. 5, the lower surface 3 includes two first side parts 21, two second side parts 22, two third side parts 23, two obtuse angle corners C1, and two acute angle corners C2 as in the case of the upper surface 2.

The cutting edge 5 is located at an intersecting part of the upper surface 2 and the side surface 4. The cutting edge 5 is used for cutting out a workpiece in a cutting process. So-called honing process may be applied to a part of the intersecting part of the upper surface 2 and the side surface 4 which is provided with the cutting edge 5. Strength of the cutting edge 5 is less likely to deteriorate by being subject to the honing process. Examples of the honing process include a round honing. The insert 1 of the present non-limiting aspect of the disclosure is a so-called one-sided insert in which the cutting edge 5 is formed only along the intersecting part of the upper surface 2 and the side surface 4. Alternatively, the insert 1 may be a so-called negative-type insert 1 in which the cutting edge 5 is also formed at an intersecting part of the lower surface 3 and the side surface 4.

The through hole 6 penetrates through the insert 1 from a center of the upper surface 2 to a center of the lower surface 3. The insert 1 of the present non-limiting aspect of the disclosure can be fixed through a clamp member 107 to the holder 103 of a cutting tool 101 by using the through hole 6 as described later with reference to FIG. 13. More specifically, a tip of the clamp member 107 for clamping is inserted into the through hole 6. The tip of the clamp member 107 is designed to push the insert 1 into the holder 103 by screwing the screw 105 for fixing the clamp member 107 into the holder 103. The insert 1 is thus fixable to the holder 103. Other methods of fixing the insert 1 to the holder 103, such as screwing, may be employed instead of the method of using the above clamp structure.

A central axis X of the through hole 6 coincides with an imaginary straight line passing through the center of the upper surface 2 and the center of the lower surface 3 in the present non-limiting aspect of the disclosure. Therefore, the central axis X of the through hole 6 may be replaced with a central axis of the insert 1. The central axis X of the insert 1 is an axis which extends between the upper surface 2 and the lower surface 3, and which serves as a rotation axis when the insert 1 is rotated in a top view. It can therefore be said that the upper surface 2 of the insert 1 has a shape with 180-degree rotational symmetry about the central axis X. The term "top view" denotes a state in which the insert 1 is viewed from a side of the upper surface 2.

The cutting edge 5 of the insert 1 in the present non-limiting aspect of the disclosure is described in detail below with reference to FIGS. 1 to 6.

Figure 6:
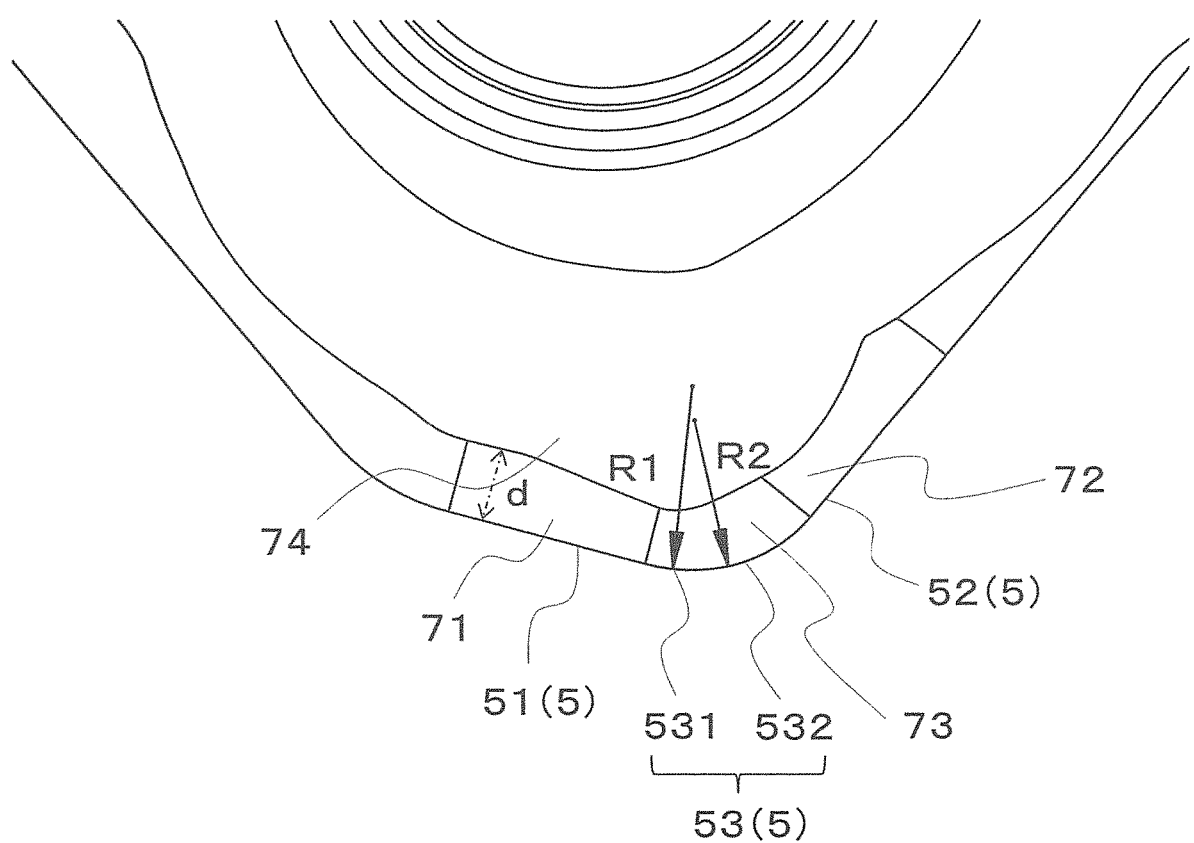
FIG. 6 is a partially enlarged view of FIG. 2.
Figure 7:
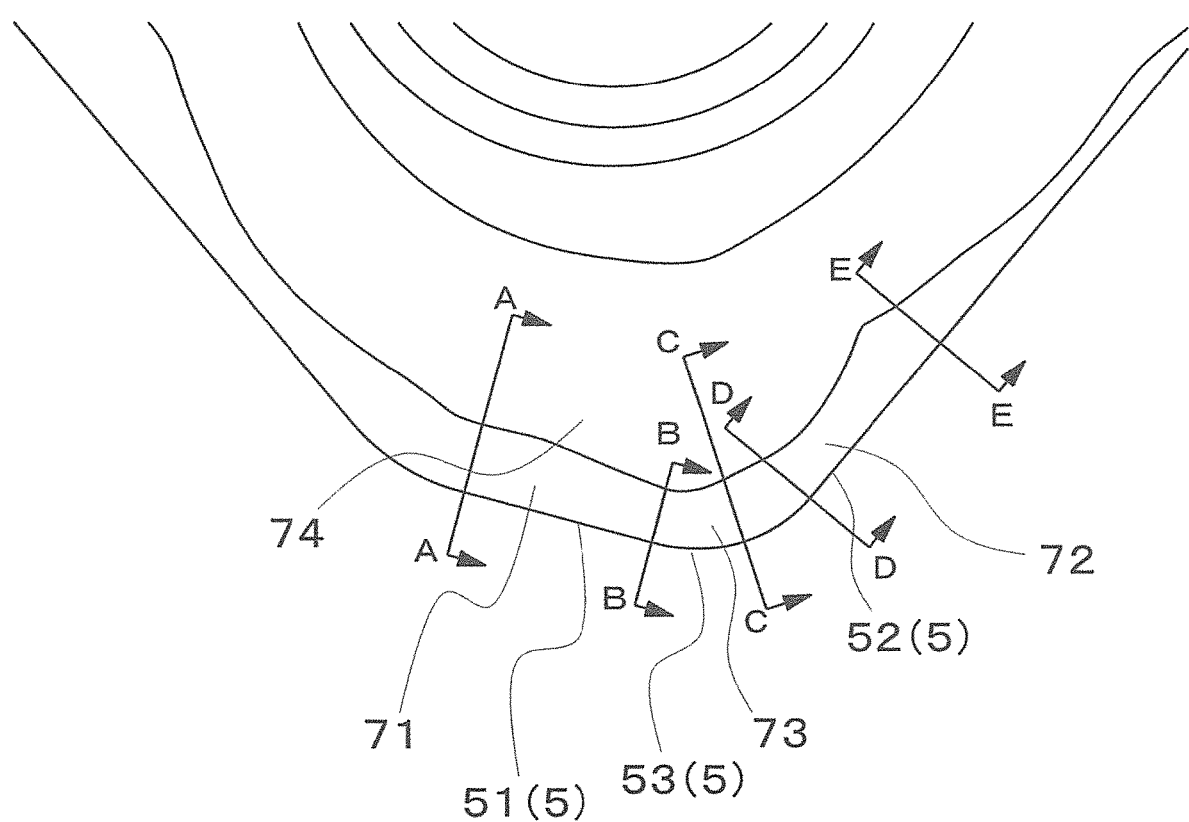
FIG. 7 is a diagram illustrating sectional positions respectively for FIGS. 8 to 12 in the partially enlarged view of FIG. 2.

The cutting edge 5 includes a first cutting edge 51, a second cutting edge 52, and a third cutting edge 53. As illustrated in FIG. 2, the first cutting edge 51 is a cutting edge located at the third side part 23 and has a straight line shape in a top view. The first cutting edge 51 is the cutting edge that mainly functions as a major cutting edge during a cutting process. The second cutting edge 52 is a cutting edge located at the second side part 22 and has a straight line shape in a top view. The second cutting edge 52 is a portion that mainly functions as a minor cutting edge during the cutting process. The third cutting edge 53 is located between the first cutting edge 51 and the second cutting edge 52. As illustrated in FIGS. 2 and 6, the third cutting edge 53 has a convex curvilinear shape in a top view. The third cutting edge 53 is a portion that functions as a so-called flat cutting edge during the cutting process. The first cutting edge 51 connects to one end of the third cutting edge 53, and the second cutting edge 52 connects to the other end of the third cutting edge 53 in the present non-limiting aspect of the disclosure. In other words, the first cutting edge 51, the third cutting edge 53, and the second cutting edge 52 are continuously located in order in the present non-limiting aspect of the disclosure. With this configuration, connecting portions of the cutting edges whose strength tends to deteriorate can be reinforced by being made into a circular arch shape. The cutting edges are therefore much less likely to be fractured. The first cutting edge 51, the third cutting edge 53, and the second cutting edge 52 need not be continuously located. For example, a certain connecting cutting edge may be located between the first cutting edge 51 and the third cutting edge 53.

In the present non-limiting aspect of the disclosure, the first cutting edge 51 is disposed asymmetrically relative to a bisector L3 of an angle α formed by the first side part 21 and the second side part 22 (an angle of the imaginary corner C2') in a top view. More specifically, the first cutting edge 51 is disposed so as to be inclined relative to a vertical line of the bisector L3. That is, the first cutting edge 51 is inclined relative to the bisector L3 so as to be located more inward as going away from the third cutting edge 53. In other words, the first cutting edge 51 is inclined at an angle θ relative to the bisector L3. The angle θ is settable to, for example, 45 degrees or more and less than 90 degrees. Because the first cutting edge 51 is inclined at the angle θ relative to the bisector L3, it is possible to ensure a large length of the first cutting edge 51 involved in the cutting process. Consequently, a cutting load per cutting edge is reducible, and a cutting edge tip is less likely to be damaged. Additionally, primary boundary damage is less likely to occur. Vibration due to an increase in thrust force is reducible because the angle θ is less than 90 degrees. It is therefore possible to offer good cutting performance even under severe cutting conditions.

The upper surface 2 is provided with a first inclined surface 71 located along the first cutting edge 51 having the above configuration in the insert 1 of the present non-limiting aspect of the disclosure. The first inclined surface 71 is inclined toward the lower surface 3 at a first inclination angle θ1 as going away from the first cutting edge 51. Specifically, the first inclined surface 71 is inclined downward at the first inclination angle θ1 as going away from the first cutting edge 51. The first inclined surface 71 is a surface along which chips generated by the corresponding first cutting edge 51 pass through, namely, the surface that functions as a rake surface.

Thus, the insert 1 includes the first cutting edge 51 disposed asymmetrically at the imaginary corner C2', and the first inclined surface 71 corresponding to the first cutting edge 51. This contributes to reducing the cutting load per cutting edge during a cutting process, thereby reducing the primary boundary damage. The insert 1 is also usable for machining at a high depth of cut.

Specifically, when the first cutting edge 51 is disposed symmetrically at the imaginary corner C2', a dedicated holder is necessary when carrying out a cutting process at a high depth of cut. However, the insert 1, in which the first cutting edge 51 is disposed asymmetrically at the imaginary corner C2' and the first cutting edge 51 is used as a major cutting edge, is suitably usable under a wider range of cutting process conditions without using a dedicated holder, while reducing the boundary damage.

Figure 8:
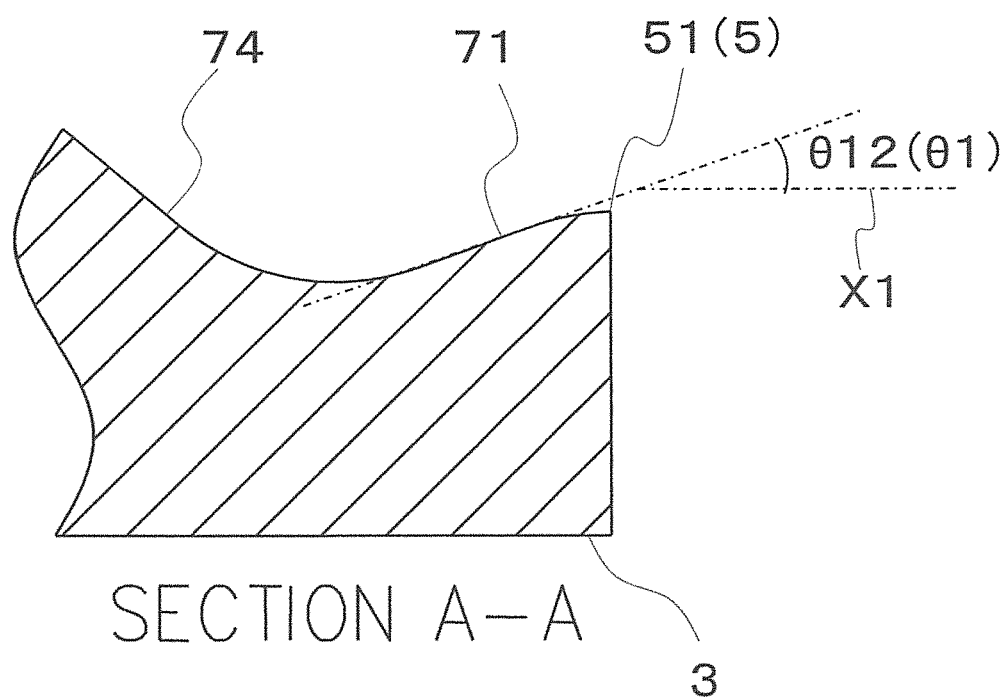
FIG. 8 is an enlarged view of a main part in a cross section taken along line A-A in FIG. 7.
Figure 9:
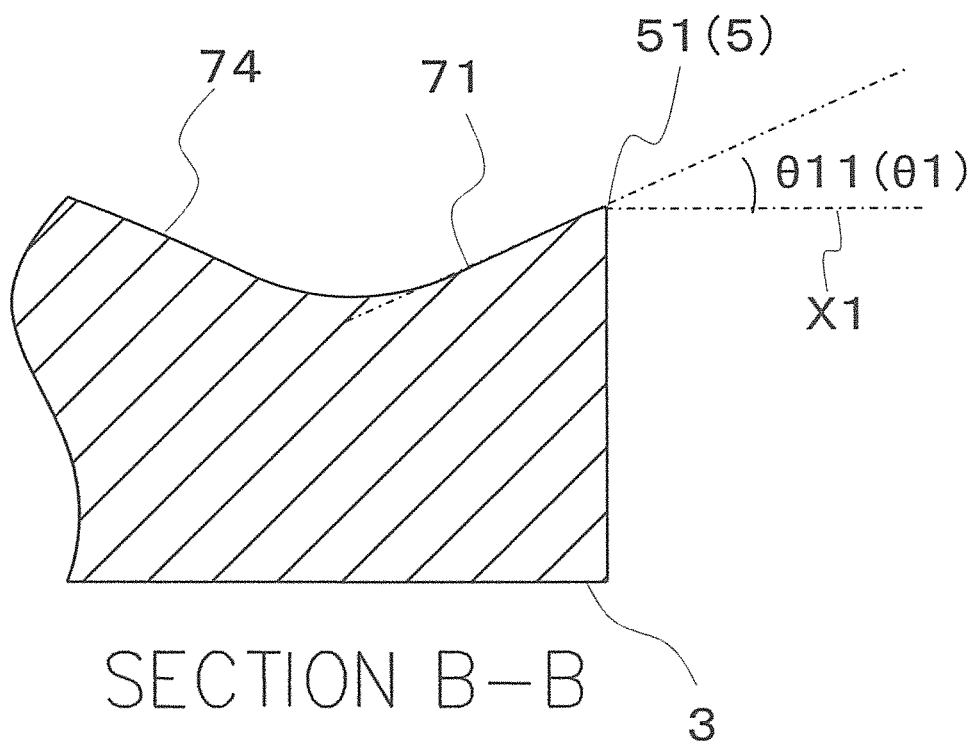
FIG. 9 is an enlarged view of a main part in a cross section taken along line B-B in FIG. 7.

Although the first inclined surface 71 is a flat surface in a cross section vertical to the first cutting edge 51 as illustrated in FIGS. 8 and 9 in the present non-limiting aspect of the disclosure, the first inclined surface 71 may be a curved surface. When the first inclined surface 71 is the flat surface, it is possible to reduce a cutting load particularly in the first cutting edge 51 that functions as the major cutting edge subjected to a higher cutting load with increasing chip thickness.

As described earlier, the insert 1 includes the two first side parts 21, the two second side parts 22, and the two third side parts 23, and has the 180-degree rotational symmetry about the central axis of the insert 1 in the present non-limiting aspect of the disclosure. Therefore, as illustrated in FIG. 2, the cutting edge 5 includes two first cutting edges 51 and 51', two second cutting edges 52 and 52', and two third cutting edges 53 and 53'. One of the first cutting edges 51, one of the second cutting edges 52, and one of the third cutting edges 53 are located at one of the acute angle corners C2. The other first cutting edge 51', the other second cutting edge 52', and the other third cutting edge 53' are located at the other acute corner C2. The insert 1 of the present non-limiting aspect of the disclosure thus configured is a so-called two-cornered insert. The cutting edge 5 in the present non-limiting aspect of the disclosure includes the two first cutting edges 51 and 51', the two second cutting edges 52 and 52', and the two third cutting edges 53 and 53'. However, the configuration of the cutting edge 5 is not limited to that in the present non-limiting aspect of the disclosure. Of course, the cutting edge 5 may include at least one first cutting edge 51, at least one second cutting edge 52, and at least one third cutting edge 53.

The third cutting edge 53 includes a first portion 531 and a second portion 532 in a top view as illustrated in FIG. 6. The second portion 532 is a portion of the third cutting edge 53 which is located closer to the second cutting edge 52 than the first portion 531. Specifically, the first portion 531 is a portion located at a side of the first cutting edge 51, and the second portion 532 is a portion located at a side of the second cutting edge. The first portion 531 and the second portion 532 have a circular arc shape. A radius of curvature R1 of the first portion 531 is greater than a radius of curvature R2 of the second portion 532.

Thus, the third cutting edge 53 includes these two portions, and it is therefore possible to further reduce thrust force, thus leading to a further reduction in vibration. Because the radius of curvature is relatively great in the first portion 531 located at the side of the first cutting edge 51, the primary boundary damage can be reduced by increasing a length of the cutting edge involved in the cutting process. Because the radius of curvature is relatively small in the second portion 532 located at the side of the second cutting edge 52, chip cutting performance can be improved by increasing the thickness of chips generated. It is therefore possible to have both the effect of reducing primary boundary damage and the effect of improving chip discharge performance. Consequently, the cutting process with high finished surface accuracy is achievable even under cutting conditions including a high depth of cut.

The radius of curvature R1 of the first portion 531 can be regarded as a radius of an imaginary circular arc of the first portion 531, and the radius of curvature R2 of the second portion 532 can be regarded as a radius of an imaginary circular arc of the second portion 532. Dimensions of the radius of curvature R2 of the first portion 531 and the radius of curvature R2 of the second portion 532 are settable according to the dimension of the insert 1. The radius R2 of the second portion 532 is settable to, for example, 0.1 mm or more and 3.2 mm or less. The radius R1 of the first portion 531 can be made greater than the radius R2 of the second portion 532.

The third cutting edge 53 in the present non-limiting aspect of the disclosure includes a region inclined toward the lower surface 3 as going away from the second cutting edge 52 in a plan view (side view) of the side surface 4 as illustrated in FIG. 3. Specifically, the third cutting edge 53 includes the region inclined downward as going away from the second cutting edge 52. This contributes to reducing thrust force exerted during the cutting process, thereby reducing damage to the cutting edge tip.

Specifically, the third cutting edge 53 is inclined toward the lower surface 3 from a position P at a side of the second cutting edge 52 in the second portion 532 to a position Q at a side of the first cutting edge 51 in the first cutting edge portion 531. In other words, a region from the position P to the position Q is inclined toward the lower surface 3. The first cutting edge 51 (major cutting edge) is therefore inclined from a starting point (the position P) that is a portion of the cutting edge 5 which is brought into contact with a workpiece in a vertical direction relative to a rotation axis of the workpiece. This contributes to enhancing the effect of reducing the thrust force, thereby further enhancing the effect of reducing damage to the cutting edge tip. Additionally, because the major cutting edge is inclined with the point P as the starting point, a length of the cutting edge used for the cutting process becomes longer, thereby reducing a cutting load per cutting edge.

The phrase that the third cutting edge 53 is inclined toward the lower surface 3 as going away from the second cutting edge 52 denotes that a height of the third cutting edge 53 from the lower surface 3 decreases as going away from the second cutting edge 52.

Although the third cutting edge 53 is inclined toward the lower surface 3 from the point P to the position Q in the present non-limiting aspect of the disclosure, the configuration of the third cutting edge 53 is not limited thereto. In other words, at least a part of the third cutting edge 53 may be inclined toward the lower surface 3. For example, the third cutting edge 53 may be inclined downward over an entire length thereof, or may include a region with a constant height.

In the present non-limiting aspect of the disclosure, the position Q coincides with a first end portion T1 of the third cutting edge 53 located at a side of the first cutting edge 51, and the position P is located more inward than a second end portion T2 of the third cutting edge 53 located at a side of the second cutting edge 52. With this configuration, when the flat cutting edge cuts out a finish surface, a circular arc shape transferred to the workpiece by the flat cutting edge can be made greater geometrically. This makes it possible to reduce finish surface roughness.

Figure 17:
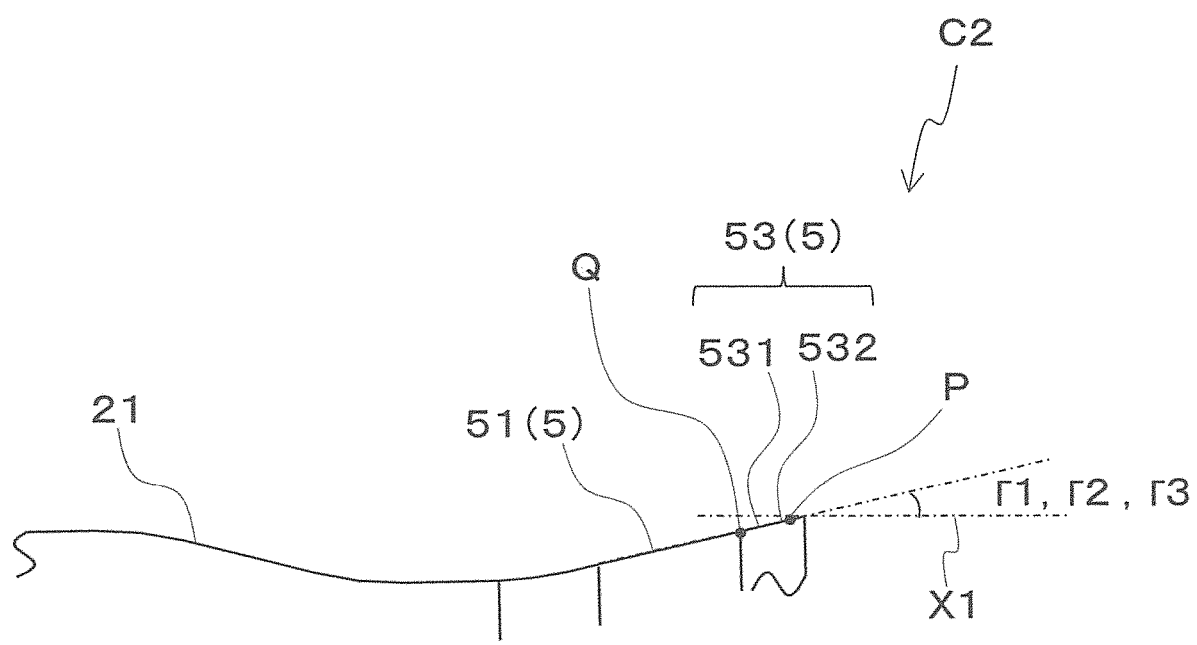
FIG. 17 is a diagram illustrating a shape of a cutting edge 5 taken from A3 direction in the cutting insert illustrated in FIG. 2.

As illustrated in FIG. 17, a region from the position P to the position Q in the third cutting edge 53 is inclined toward the lower surface 3 at a constant angle in the present non-limiting aspect of the disclosure. In other words, the first portion 531 is inclined toward the lower surface 3 at a first angle γ1, and the second portion 532 is inclined toward the lower surface 3 at a second angle γ2 as illustrated in FIG. 17. The first angle γ1 is equal to the second angle γ2. Sudden abnormal damage is therefore less likely to occur.

A part of the third cutting edge 53 may be inclined. For example, the third cutting edge 53 may include a region with a constant height from the lower surface 3. The term "constant angle" denotes that the angles may be substantially constant, in other words, the first angle γ1 may be substantially equal to the second angle γ2. For example, a difference between the first angle γ1 and the second angle γ2 may be an approximately ±0.5 degrees.

FIG. 17 is a diagram when the cutting edge 5 of the insert 1 is viewed along the second side part 22, namely, the second cutting edge 52. The first angle γ1 of the first portion 531 and the second angle γ2 of the second portion 532 can be defined in a side view of the insert 1 thus viewed along the second cutting edge 52. That is, for example, the first angle γ1 is an inclination angle of the first portion 531 relative to a reference plane X1 vertical to the central axis X as illustrated in FIG. 17. This is also true for the second angle γ2.

The first angle γ1 is settable to, for example, 6-18 degrees, and the second angle γ2 is settable to, for example, 6-18 degrees.

Although the third cutting edge 53 is inclined from the position P to the position Q at the constant angle (the first angle 41 is equal to the second angle γ2) as described above in the present non-limiting aspect of the disclosure, the configuration of the third cutting edge 53 is not limited thereto. For example, the third cutting edge 53 may include a plurality of portions (regions) respectively inclined downstream at angles different from each other. Specifically, for example, the first angle γ1 may be different from the second angle γ2, or the third cutting edge 53 may include three or more portions (regions) respectively inclined at angles different from one another.

The first cutting edge 51 is inclined toward the lower surface 3 as going away from the third cutting edge 53 in a side view as illustrated in FIG. 3 in the present non-limiting aspect of the disclosure. Specifically, the first cutting edge 51 is inclined downward as going away from the third cutting edge 53. This makes it possible to further reduce thrust force, thereby enhancing the effect of reducing damage to the cutting edge tip.

The first cutting edge 51 is inclined downward at a third angle γ3 over an entire length thereof as illustrated in FIG. 17 in the present non-limiting aspect of the disclosure. This contributes to further enhancing the effect of reducing sudden abnormal damage. The configuration of the first cutting edge 51 is not limited thereto. Alternatively, only a part of the first cutting edge 51 may be inclined downward, or a part of the first cutting edge 51 may not be inclined. For example, the first cutting edge 51 may include a region with a constant height from the lower surface 3. For example, the first cutting edge 51 may include a plurality of regions respectively inclined at angles different from each other. For example, an inclination angle of the first cutting edge 51 may gradually decrease or increase.

The third angle γ3 can be defined similarly to the first angle γ1 and the second angle γ2. That is, for example, the third angle γ3 is an inclination angle of the first cutting edge 51 relative to the reference plane X1 vertical to the central axis X as illustrated in FIG. 17. The third angle γ3 is settable to, for example, 6-18 degrees.

An inclination angle of the third cutting edge 53 (the first angle γ1, the second angle γ2) is equal to an inclination angle of the first cutting edge 51 (the third angle γ3) as illustrated in FIG. 17 in the present non-limiting aspect of the disclosure. Specifically, the third cutting edge 53 smoothly connects to the first cutting edge 51, and both are arranged in a straight line shape in a side view. This contributes to further reducing sudden abnormal damage.

The phrase that the inclination angle of the third cutting edge 53 is equal to the inclination angle of the first cutting edge 51 denotes that the inclination angle of the third cutting edge 53 may be approximately equal to the inclination angle of the first cutting edge 51, and a difference therebetween may be in a range of ±0.5 degrees. Although the inclination angle of the third cutting edge 53 is equal to the inclination angle of the first cutting edge 51 as described above in the present non-limiting aspect of the disclosure, the configurations of the third cutting edge 53 and the first cutting edge 51 are not limited thereto. For example, the third cutting edge 53 may be inclined at an angle different from that of the first cutting edge 51.

Figure 11:
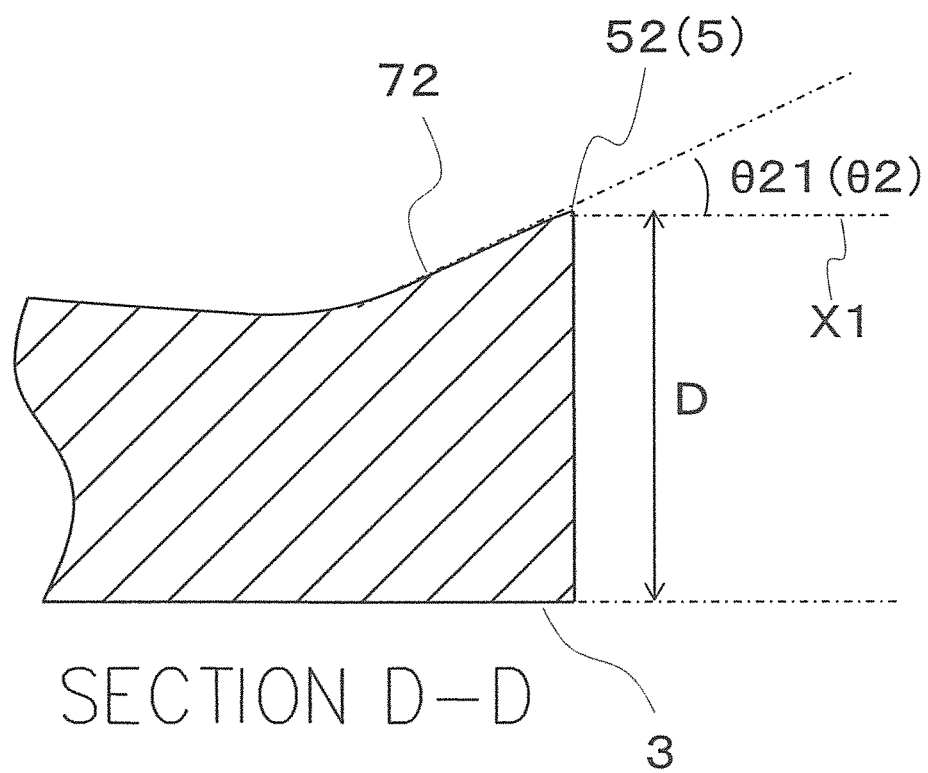
FIG. 11 is an enlarged view of a main part in a cross section taken along line D-D in FIG. 7.

A height of the second cutting edge 52 is constant as illustrated in FIG. 3 in the present non-limiting aspect of the disclosure. This contributes to reducing an excessive increase in cutting resistance and also improving finish surface roughness. The term "the height of the second cutting edge 52" denotes a height of the second cutting edge 52 relative to the lower surface 3 (a height of the second cutting edge 52 from the lower surface 3), specifically, a distance D between the lower surface 3 and the second cutting edge 52 in a direction vertical to the lower surface 3 as illustrated in FIGS. 3 and 11. In other words, in the present non-limiting aspect of the disclosure in which the lower surface 3 is the flat surface, the height of the second cutting edge 52 denotes the height of the second cutting edge 52 from the flat plane vertical to the central axis X of the through hole 6 including the lower surface 3. The phrase that the height of the second cutting edge 52 is constant denotes that the height of the second cutting edge 22 may be approximately the same over the entire length of the second cutting edge 22. For example, the height of the second cutting edge 22 may include a variation in a range of 5-8% in terms of dimension in a thickness direction of the insert 1.

Alternatively, the height of the second cutting edge 52 may increase as going away from the third cutting edge 53. In other words, the second cutting edge 52 may be inclined so as to be located further away from the lower surface 3 as going away from the third cutting edge 53 in a side view. This contributes to improving finish surface roughness. An inclination angle of the second cutting edge 52 may be the same as or different from each of the inclination angle of the first cutting edge 51 and the inclination angle of the third cutting edge 53. When the inclination angle of the second cutting edge 52 is smaller than each of the inclination angle of the first cutting edge 51 and the inclination angle of the third cutting edge 53, chips generated by the major cutting edge (first cutting edge 51) can be smoothly raised by a rake surface 72 connecting to the minor cutting edge (second cutting edge 52), thus leading to good chip discharge.

The upper surface 2 further includes a second inclined surface 72 and a third inclined surface 73 in the present non-limiting aspect of the disclosure. The second inclined surface 72 is a surface located along the second cutting edge 52. The third inclined surface 73 is a surface located along the third cutting edge 53. The second inclined surface 72 is inclined toward the lower surface 3 at a second inclination angle θ2 as going away from the second cutting edge 52. The third inclined surface 73 is inclined toward the lower surface 3 at a third inclination angle θ3 as going away from the third cutting edge 53. In other words, each of the second inclined surface 72 and the third inclined surface 73 is inclined downward as going away from the corresponding cutting edge. Similarly to the first inclined surface 71, the second inclined surface 72 and the third inclined surface 73 are also surfaces along which chips generated by their corresponding cutting edges (the second cutting edge 52 and the third cutting edge 53) pass through, namely, the surfaces serving as a rake surface.

As illustrated in FIGS. 8 to 12, the third inclination angle θ3 of the third inclined surface 73 is greater than each of the first inclination angle θ1 of the first inclined surface 71 and the second inclination angle θ2 of the second inclined surface 72. The inclination angles (θ1 and θ2) of the first inclined surface 71 along the first cutting edge 51 and the second inclined surface 72 along the second cutting edge 52 which are respectively located at both end sides of the third cutting edge 53 having a curvilinear shape are relatively small. Thus, the first inclination angle θ1, the second inclination angle θ2, and the third inclination angle θ3 satisfy the above magnitude relationship. Consequently, the shape of the rake surface corresponding to the cutting edge 5 becomes such a concave shape that a region corresponding to the third cutting edge 53 is recessed downward. Hence, chip cutting performance can be enhanced, and chips generated can be curled well around the third cutting edge 53. As a result, the chips can be discharged smoothly, and the chips are therefore less likely to be caught up. This leads to enhanced finish surface accuracy and also contributes to reducing sudden damage to the cutting edge tip.

The strength of the first cutting edge 51 subjected to a large load during the cutting process can be enhanced because the third inclination angle θ3 is greater than the first inclination angle θ1. The cutting edge is therefore less likely to be fractured.

Here, the first inclination angle θ1, the second inclination angle θ2, and the third inclination angle θ3 can be respectively regarded as an inclination angle of each of the inclined surfaces with respect to the reference plane X1 vertical to the central axis X of the through hole 6. Because the lower surface 3 is the flat surface vertical to the central axis X in the present non-limiting aspect of the disclosure, the first inclination angle θ1, the second inclination angle θ2, and the third inclination angle θ3 can be respectively regarded as an inclination angle of each of the inclined surfaces with respect to the lower surface 3. That is, it can be said that the first inclination angle θ1, the second inclination angle θ2, and the third inclination angle θ3 are rake angles of their corresponding inclined surfaces. For example, the first inclination angle θ1, the second inclination angle θ2, and the third inclination angle θ3 can be defined as illustrated in FIGS. 8 to 12.

The first inclination angle θ1 is settable to, for example, 18-28 degrees. The second inclination angle θ2 is settable to, for example, 18-28 degrees. The third inclination angle θ3 is settable to, for example, 20-30 degrees.

Figure 10:
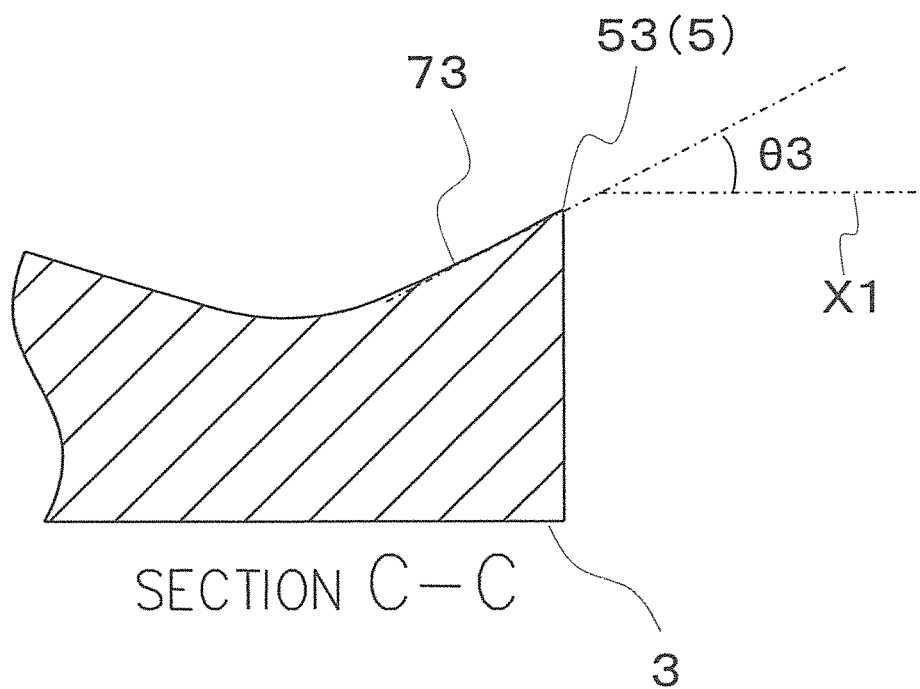
FIG. 10 is an enlarged view of a main part in a cross section taken along line C-C in FIG. 7.
Figure 12:
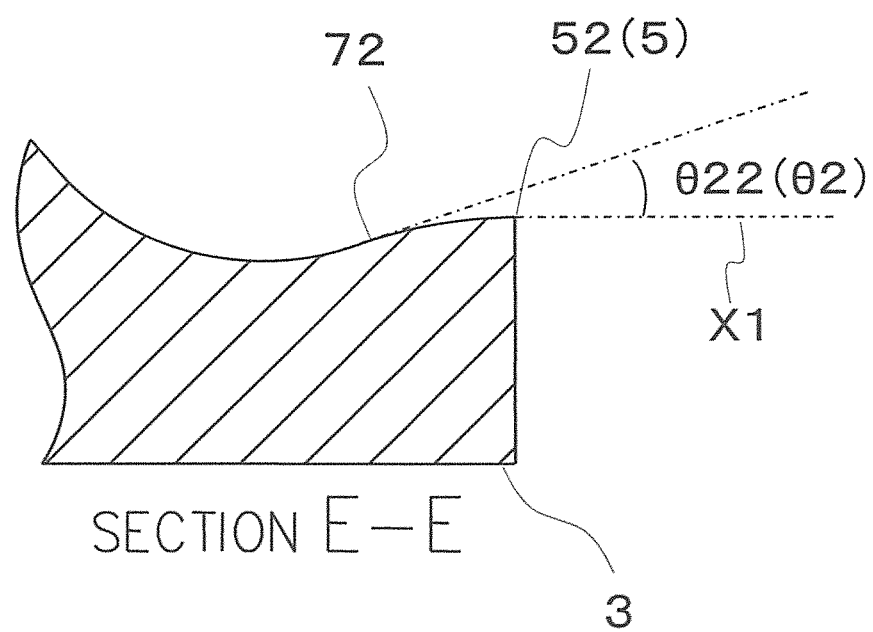
FIG. 12 is an enlarged view of a main part in a cross section taken along line E-E in FIG. 7.

Similarly to the first inclined surface 71, the second inclined surface 72 and the third inclined surface 73 are flat surfaces in a cross section vertical to the corresponding cutting edge 5 (the second cutting edge 52 or the third cutting edge 53) as illustrated in FIGS. 10 to 12 in the present non-limiting aspect of the disclosure. Alternatively, the second inclined surface 72 and the third inclined surface 73 may be curved surfaces. However, when both are the flat surfaces, a cutting load is reducible.

The third inclination angle $\theta 3$ of the third inclined surface 73 may be constant over an entire length of the third cutting edge 53. With this configuration, a load exerted on the third cutting edge 53 whose cutting edge length is short can be made close to an approximately constant value over the entire length of the third cutting edge 53. The cutting edge is therefore less likely to be fractured.

The first inclination angle $\theta 1$ of the first inclined surface 71 may decrease as going away from the third cutting edge 53. Specifically, an inclination angle $\theta 12$ at an end portion on the opposite side of an end portion on a side of the third cutting edge 53 of the first inclination surface 71 is smaller than an inclination angle $\theta 11$ at an end portion on a side of the third cutting edge 53 of the first inclined surface 71 as illustrated in FIGS. 8 and 9. This further enhances chip discharge performance. The strength of the cutting edge can also be enhanced, and the cutting edge is less likely to be damaged.

Additionally, the second inclination angle $\theta 2$ of the second inclined surface 72 may also decrease as going away from the third cutting edge 53. Specifically, an inclination angle $\theta 22$ at an end portion on the opposite side of an end portion on a side of the third cutting edge 53 of the second inclination surface 72 is smaller than an inclination angle $\theta 21$ at an end portion on a side of the third cutting edge 53 of the second inclined surface 72 as illustrated in FIGS. 11 and 12. This further enhances the effect of improving chip discharge performance. The strength of the cutting edge 5 can also be further enhanced, and the cutting edge is much less likely to be damaged.

The phrase that the first inclination angle $\theta 1$ of the first inclined surface 71 decreases denotes that the first inclination angle $\theta 1$ may decrease in at least a partial region of the first inclined surface 71, and the first inclined surface 71 may include a region in which the first inclination angle $\theta 1$ remains unchanged. Similarly, the phrase that the second inclination angle $\theta 2$ of the second inclined surface 72 decreases denotes that the second inclination angle $\theta 2$ may decrease in at least a partial region of the second inclined surface 72, and the second inclined surface 72 may include a region in which the second inclination angle $\theta 2$ remains unchanged.

When the first inclination angle $\theta 1$ and the second inclination angle $\theta 2$ decrease, a decrement of the first inclination angle $\theta 1$ can be made smaller than a decrement of the second inclination angle $\theta 2$. This makes it possible to stably curl chips generated, and a chip discharge direction can be oriented in a direction away from a finish surface. With this configuration, because chip discharge performance can be improved and chips are less likely to be caught up, finish surface accuracy can be improved, and sudden damage to the cutting edge tip can be reduced.

The decrement of the first inclination angle $\theta 1$ can be regarded as a difference between the first inclination angle $\theta 1$ at one end of the first inclined surface 71 along the first cutting edge 51 and the first inclination angle $\theta 1$ at the other end thereof. Similarly, the decrement of the second inclination angle $\theta 2$ can be regarded as a difference between the second inclination angle $\theta 2$ at one end of the second inclined surface 72 along the second cutting edge 52 and the second inclination angle $\theta 2$ at the other end thereof. For example, the decrement of the first inclination angle $\theta 1$ is a difference between $\theta 11$ and $\theta 12$, and the decrement of the second inclination angle $\theta 2$ is a difference between $\theta 21$ and $\theta 22$.

The upper surface 2 further includes a fourth inclined surface 74 as illustrated in FIGS. 8 and 9 in the present non-limiting aspect of the disclosure. The fourth inclined surface 74 is located more inward than the first inclined surface 71, and is inclined so as to be located further away from the lower surface 3 as going away from the first cutting edge 51. Specifically, the fourth inclined surface 74 is a raised surface located along the first cutting edge 51 as illustrated in FIGS. 8 and 9. As illustrated in FIG. 6, a distance "d" between the first cutting edge 51 and the fourth inclined surface 74 increases as going away from the third cutting edge 5 in a top view. This makes it possible to spirally curl chips, thereby stably discharging the chips.

The term "the distance "d" between the first cutting edge 51 and the fourth inclined surface 74" can be regarded as a distance between the first cutting edge 51 and the fourth inclined surface 74 in a direction vertical to the first cutting edge 51.

Although the distance "d" between the first cutting edge 51 and the fourth inclined surface 74 gradually increases as going away from the third cutting edge 53 in the present non-limiting aspect of the disclosure, the distance "d" is not limited to thereto. For example, the fourth inclined surface 74 may include a region in which the distance "d" is kept at a constant value.

Although the fourth inclined surface 74 is a flat surface in a cross section vertical to the first cutting edge 51 as illustrated in FIGS. 8 and 9 in the present non-limiting aspect of the disclosure, the fourth inclined surface 74 may be a curved surface. However, when the fourth inclined surface 74 is the flat surface, a large contact area with chips can be ensured. Therefore, a chip discharge direction can be stabilized in a direction away from the finish surface, thus leading to enhanced chip discharge performance. Additionally, when chips with a large thickness come into contact with the fourth inclined surface 74 during a cutting process at a high feed rate, it is possible to reduce a load due to friction between the chips and the raised surface.

The first inclined surface 71 smoothly connects to the fourth inclined surface 74 in the present non-limiting aspect of the disclosure. Specifically, the flat first inclined surface 71 connects through a curved surface, namely, a so-called fillet surface to the flat fourth inclined surface 74. Because the fillet surface is an inevitable surface in design, it can be said that the first inclined surface 71 connects to the fourth inclined surface 74. The first inclined surface 71 may directly connect to the fourth inclined surface 74, or alternatively may connect to each other with another surface interposed therebetween. When the first inclined surface 71 connects directly to the fourth inclined surface 74 as in the case of the present non-limiting aspect of the disclosure, it is possible to minimize the number of inflection points from the rake surface to a raised surface of chips. This leads to a smooth discharge of the chips, thus making it possible to reduce a load exerted during discharge of the chips.

Alternatively, the fourth inclined surface 74 may extend so as to be located along the second cutting edge 52 and the third cutting edge 53 in the present non-limiting aspect of the disclosure. Even with this configuration, chip discharge performance can be enhanced. A distance between the fourth inclined surface 74 and each of the cutting edges may be relatively small in a region corresponding to a connection part of the second cutting edge 52 and the third cutting edge 53. This configuration further enhances the effect of spirally curling chips and stably discharging the chips.

While the insert 1 of the present non-limiting aspect of the disclosure has been described above with reference to the drawings, the insert of the present disclosure is not limited thereto.

For example, in the insert of the present non-limiting aspect of the disclosure, the shape of the upper surface 2 is the quadrangular shape, specifically, the approximately rhombus shape in a top view as illustrated in FIG. 2, the shape of the upper surface 2 is not limited thereto. For example, the shape of the upper surface 2 in a top view may be a polygonal shape, such as a triangular shape, a pentagonal shape, a hexagonal shape, or an octagonal shape.

For example, the first inclined surface 71 may connect directly to the first cutting edge 51, or alternatively may connect to the first cutting edge 51 with a land part interposed therebetween. This is also true for the second inclined surface 72 and the third inclined surface 73.

<Cutting Tool>

A cutting tool 101 in a non-limiting aspect of the present disclosure is described below with reference to the drawings.

Figure 13:
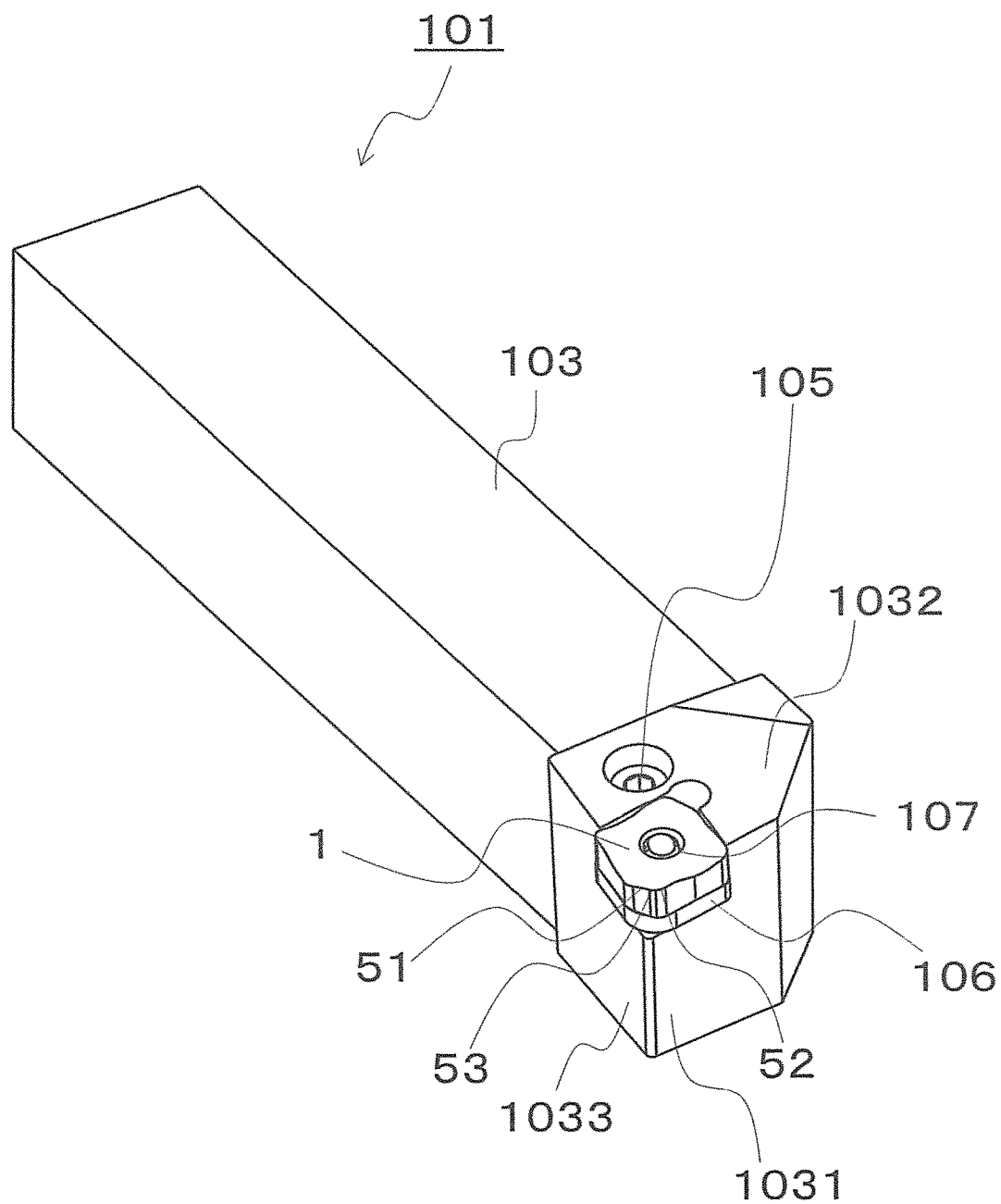
FIG. 13 is a perspective view illustrating a cutting tool in a non-limiting aspect of the present disclosure.

As illustrated in FIG. 13, the cutting tool 101 of the present non-limiting aspect of the disclosure includes the insert 1 represented by the above non-limiting aspects of the disclosure, and a holder 103 designed to attach the insert 1 thereto.

The holder 103 has a bar shape that extends long and narrow in the present non-limiting aspect of the disclosure. One end part (front end part) of the holder 103 is provided with an insert pocket that permits attachment of the insert 1. The insert pocket is a part which permits attachment of the insert 1, and which opens in a front end surface 1031 and two side surfaces 1032 and 1033 of the holder 103. For example, steel and cast iron are usable as material of the holder 103. Of these materials, high-rigidity steel is particularly suitable.

The attachment of the insert 1 to the holder 103 is described below.

The insert 1 is attached to the inert pocket so that the cutting edge 5 protrudes outward from an outer periphery of the holder 103. More specifically, the insert 1 is attached to the holder 103 so that the first cutting edge 51 is usable as a major cutting edge and the second cutting edge 52 is usable as a minor cutting edge. That is, the first cutting edge 51 is located at a side of the side surface 1033 of the holder 103, and the second cutting edge 52 is located at a side of the front end surface 1031 of the holder 103 as illustrated in FIG. 13. The third cutting edge 53 is located at a corner part formed by the front end surface 1031 and the side surface 1033.

The insert 1 is fixed to the insert pocket by a clamp member 107 in the present non-limiting aspect of the disclosure. Specifically, a bolt 105 is inserted into a through hole of the clamp member 107 in a state in which a tip of the clamp member 107 is inserted into the through hole 6 of the insert 1. Screw parts are engaged with each other by inserting a tip of the bolt 105 into a screw hole (not illustrated) formed in the holder 103, so that the tip of the clamp member 107 presses the insert 1 against the holder 103. Thus, the insert 1 is attachable to the holder 103.

A sheet member 106 is disposed between the insert pocket and the insert 1 in the present non-limiting aspect of the disclosure. Consequently, the insert 1 is less likely to be fractured or the like. Different shapes are applicable to the sheet member.

Because the cutting tool 101 of the present non-limiting aspect of the disclosure includes the insert 1 having the above characteristic configurations, good machining can be carried out even under cutting conditions including a high depth of cut, while reducing primary boundary damage by reducing a cutting load. Good cutting performance is achievable with a general-purpose holder even during machining under severe cutting conditions, such as machining of a difficult-to-cut material.

<Method of Manufacturing Machined Product>

A method of manufacturing a machined product in a non-limiting aspect of the present disclosure is described below with reference to the drawings.

Figure 14:
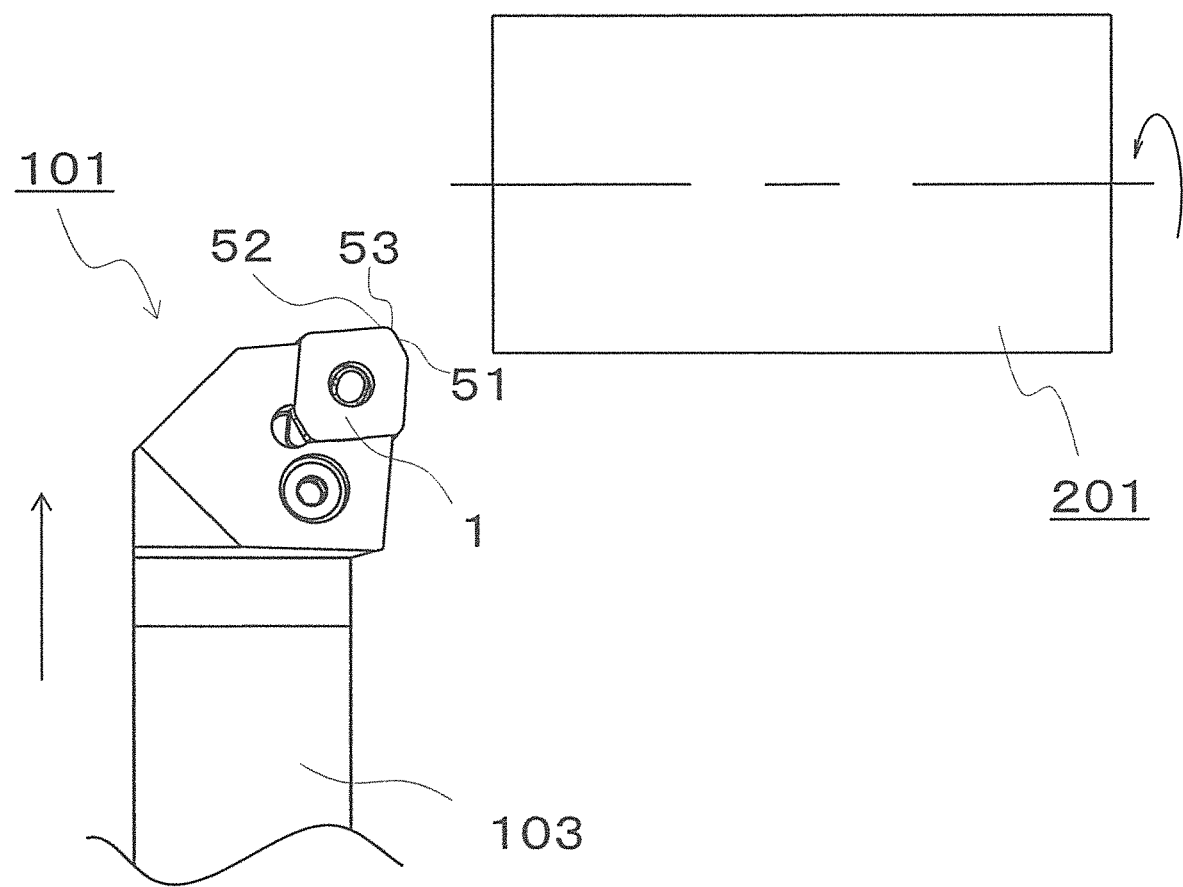
FIG. 14 is a schematic diagram illustrating a step in a method of manufacturing a machined product.
Figure 15:
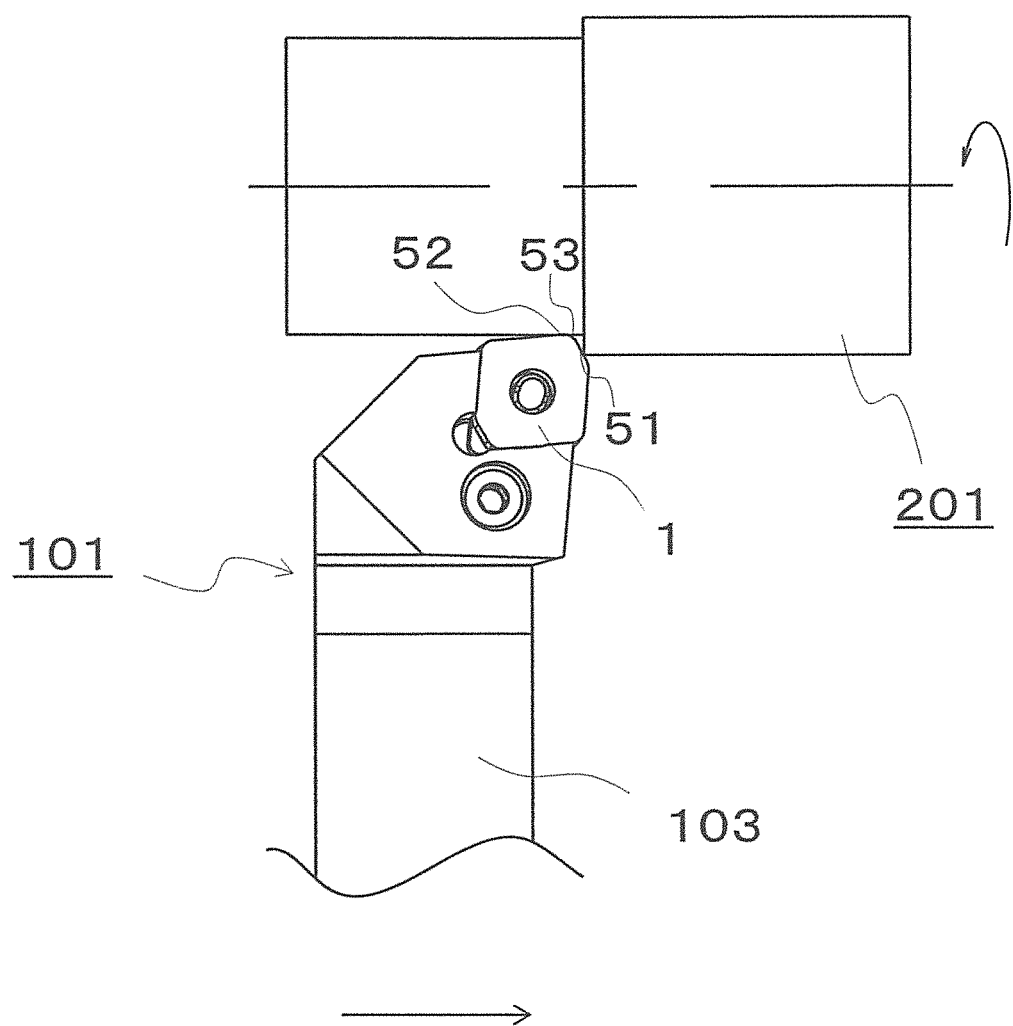
FIG. 15 is a schematic diagram illustrating a step in the method of manufacturing a machined product.
Figure 16:
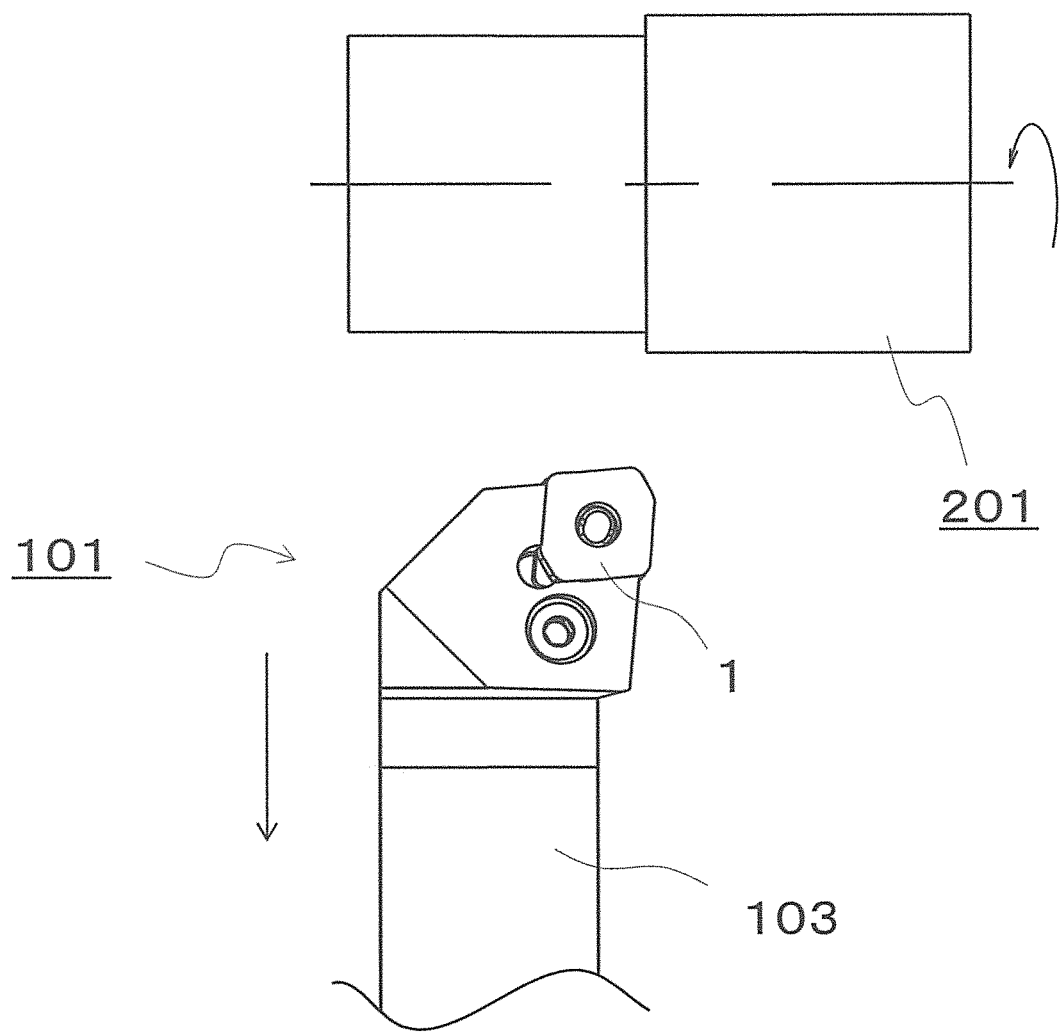
FIG. 16 is a schematic diagram illustrating a step in the method of manufacturing a machined product.

The manufacturing method of the present non-limiting aspect of the disclosure includes the following steps:

(1) bringing the cutting tool 101 represented by the above non-limiting aspects of the disclosure relatively near a workpiece 201 in a state in which the workpiece 201 is rotated as illustrated in FIG. 14;

(2) bringing the cutting edge 5 of the cutting tool 101 into contact with the workpiece 201 being rotated as illustrated in FIG. 15; and (3) moving the cutting tool 101 away from the workpiece 201 as illustrated in FIG. 16.

The insert 1 of the cutting tool 101 includes the cutting edge 5 having the above characteristic configurations in the method of manufacturing a machined product in the present non-limiting aspect of the disclosure. Hence, good machining is achievable during machining under severe cutting conditions, such as machining of a difficult-to-cut material, and under cutting conditions including a high depth of cut.

Specifically, the cutting edge 5 comes into contact with the workpiece 201 so that the first cutting edge 51 serves as a major cutting edge and the second cutting edge 52 serves as a minor cutting edge as illustrated in FIG. 15. As described earlier, the first cutting edge 51 is inclined at an angle θ and disposed asymmetrically relative to the bisector L3 of the imaginary corner C'2. Accordingly, the third cutting edge 53 located between the first cutting edge 51 and the second cutting edge 52 functions to improve finish surface accuracy together with the second cutting edge 52. Moreover, the primary boundary damage is reducible by ensuring a large length of the cutting edge functioning as the major cutting edge. It is therefore possible to perform a good cutting process with high finish surface accuracy even under the cutting conditions including a high depth of cut.

Additionally, because the first cutting edge 51 is disposed asymmetrically relative to the bisector L3 at the imaginary corner C2' as illustrated in FIG. 15, the cutting edge tip does not retreat significantly in a central direction of the insert. Hence, no dedicated holder is needed and good cutting performance is achievable with a general-purpose holder even during the cutting process at a high depth of cut.

In FIG. 14, the workpiece 201 is rotated and the cutting tool 101 is brought near the workpiece 201 in a state in which a rotation axis Y of the workpiece 201 is fixed. In FIG. 15, the cutting process is carried out by bringing the cutting tool 101 into contact with the workpiece 201 in a state in which the workpiece 201 is rotated. In FIG. 16, the workpiece 201 is rotated and the cutting tool 101 is moved away from the workpiece 201 in a state in which the rotation axis Y is fixed. Although the workpiece 201 is rotated and the cutting tool 101 is moved in the state in which the rotation axis Y is fixed in each of the steps in the present non-limiting aspect of the disclosure, there is, of course, no intention to limit thereto.

For example, the workpiece 201 may be brought near the cutting tool 101 in the step (1). Similarly, the workpiece 201 may be moved away from the cutting tool 101 in the step (3). When the cutting process is continued, it is necessary to repeat the step of bringing the cutting edge 5 of the insert 1 into contact with different portions of the workpiece 201, while keeping the workpiece 201 rotated. When the cutting edge 6 being used is worn out, an unused cutting 5 may be used by rotating the insert 1 180 degrees around the central axis X of the through hole 6.

Examples of material of the workpiece 201 include super heat resistant alloy, carbon steel, alloy steel, stainless steel, cast iron, and nonferrous metals. Examples of super heat resistant alloy include nickel-based alloys.

While the non-limiting aspects of the present disclosure have been illustrated and described above, the present disclosure is not limited to the foregoing embodiments. It is, of course, possible to make any optional ones insofar as they do not depart from the gist of the present disclosure.

DESCRIPTION OF THE REFERENCE NUMERALS 1 cutting insert (insert)
2 first surface (upper surface)
21 first side part
22 second side part
23 third side part
3 second surface (lower surface)
4 third surface (side surface)
5 cutting edge
51, 51' first cutting edge
52, 52' second cutting edge
53, 53' third cutting edge
  531 first portion
  532 second portion
6 through hole
71 first inclined surface
72 second inclined surface
73 third inclined surface
74 fourth inclined surface
101 cutting tool
103 holder
  1031 front end surface
  1032 side surface
  1033 side surface
105 bolt
106 sheet member
107 clamp member
201 workpiece

What is claimed is:

1. A cutting insert, comprising:
a first surface comprising a first side part, a second side part, and a third side part located between the first side part and the second side part;
a second surface located opposite of the first surface;
a third surface located between the first surface and the second surface; and
a cutting edge located at an intersection of the first surface and the third surface,
  wherein
    the cutting edge comprises:
      a first cutting edge located at the third side part and having a straight line shape in a plan view of the first surface,
      a second cutting edge located at the second side part and having a straight line shape in the plan view, and
      a third cutting edge located between the first cutting edge and the second cutting edge and having a convex curvilinear shape in the plan view; and
    the first cutting edge is located asymmetrically relative to a bisector of an angle formed by the first side part and the second side part in the plan view;
    the first surface comprises:
      a first inclined surface located along the first cutting edge and inclined toward the second surface at a first inclination angle as going away from the first cutting edge,
      a second inclined surface located along the second cutting edge and inclined toward the second surface at a second inclination angle as going away from the second cutting edge, and
      a third inclined surface located along the third cutting edge and inclined toward the second surface at a third inclination angle as going away from the third cutting edge;
    the third inclination angle is greater than each of the first inclination angle and the second inclination angle;
    each of the first inclination angle and the second inclination angle decreases as going away from the third cutting edge; and
    a decrement of the first inclination angle is smaller than a decrement of the second inclination angle.

2. The cutting insert according to claim 1, wherein the third cutting edge comprises a first portion having a circular arc shape and a second portion having a circular arc shape located closer to the second cutting edge than the first portion in the plan view,
a radius of curvature of the first portion is a first radius,
a radius of curvature of the second portion is a second radius, and
the first radius is greater than the second radius.

3. The cutting insert according to claim 2, wherein the first portion is inclined toward the second surface as going away from the second cutting edge, and the second portion is inclined toward the second surface as going away from the second cutting edge.

4. The cutting insert according to claim 3, wherein an inclination angle of the first portion is a first angle, an inclination angle of the second portion is a second angle, and
the first angle is equal to the second angle.

5. The cutting insert according to claim 4, wherein the first cutting edge is inclined toward the second surface as going away from the third cutting edge.

6. The cutting insert according to claim 5, wherein an inclination angle of the first cutting edge is a third angle, and
the third angle is equal to the first angle and the second angle.

7. The cutting insert according to claim 1, wherein a height of the second cutting edge is constant.

8. The cutting insert according to claim 1, wherein the third inclination angle is constant over the third cutting edge.

9. A cutting tool, comprising:
the cutting insert according to claim 1; and
a holder configured to attach the cutting insert to the holder.

10. A method of manufacturing a machined product, comprising:
rotating a workpiece;

bringing the cutting edge of the cutting tool according to claim 9 contact with the workpiece being rotated; and
moving the cutting tool away from the workpiece.

\* \* \* \* \*